United States Patent [19]

Yasuda et al.

[11] Patent Number: 4,973,366
[45] Date of Patent: Nov. 27, 1990

[54] INSERT MATERIAL FOR SOLID PHASE DIFFUSION WELDING FOR NICKEL BASE SUPERALLOY AND METHOD THEREFOR

[75] Inventors: Takeshi Yasuda; Akira Okayama; Mitsuru Kobayashi; Hideyo Kodama; Masateru Suwa, all of Ibaraki, Japan

[73] Assignee: The Agency of Industrial Science and Technology, Tokyo, Japan

[21] Appl. No.: 246,708

[22] Filed: Sep. 20, 1988

[30] Foreign Application Priority Data

Nov. 19, 1987 [JP] Japan ................................ 62-290716

[51] Int. Cl.$^5$ ............................................. C22F 1/10
[52] U.S. Cl. ........................... 148/11.5 N; 148/11.5 Q; 148/127; 228/263.13
[58] Field of Search ............... 148/11.5 N, 11.5 Q, 148/127, 13, 13.1, 20.3; 409, 410, 426–429; 420/445–448; 228/263.13

[56] References Cited

U.S. PATENT DOCUMENTS 3,632,319 1/1972 Hoppin ................................ 29/487
3,692,501 9/1972 Hoppin ................................ 29/196.6
3,700,427 10/1972 Hoppin ................................ 75/0.5 R

FOREIGN PATENT DOCUMENTS 47-33850 11/1972 Japan .
49-6470 2/1974 Japan .

OTHER PUBLICATIONS

C. T. Sims et al., The Superalloys, J. Wiley & Sons, 1972, pp. 259–281, 596–599.
K. Yasuda et al., Mechanical Properties and Microstructure of Melt-Spun Superalloy Ribbons, 1984.
K. Yasuda et al., Application of Melt-Spun Superalloy Ribbons to Solid Phase Diffusion Welding for Ni-Base Superalloy, 1988.

*Primary Examiner*—R. Dean
*Attorney, Agent, or Firm*—Pennie & Edmonds

[57] ABSTRACT

In solid phase diffusion welding of a nickel base superalloy having nickel as a main component, an insert material for solid phase diffusion welding and method thereof are disclosed which can improve the welding strength, the insert material consists of an alloy containing 5–25% by atomic % of total atomic amount of at least one selected from aluminum, titanium, tantalum and niobium, [100−(total atomic % of aluminum, titanium, tantalum and niobium)×4] % or less by atomic % of total atomic amount of at least one selected from chromium, cobalt, tungsten, molybdenum and zirconium and the balance being substantially nickel.

After this insert material is previously subjected to heat treatment at between 700° C. and melting point or plastic working, it is interposed between the welded surfaces and heated up to a temperature of the melting point or less of base metal in vacuum or inactive gas solid phase diffusion welding.

10 Claims, 4 Drawing Sheets

| INSERT MATERIAL | HEAT-TREATED TEMPERATURE (°C × 1h) 600  700  800  900  1000 |
|---|---|
| IN738LC | γ' / MC / M23C6 |
| RENÉ80 | γ' / MC / M23C6 / M6C |

INSERT MATERIAL FOR SOLID PHASE DIFFUSION WELDING FOR NICKEL BASE SUPERALLOY AND METHOD THEREFOR

BACKGROUND OF THE INVENTION

1. Field of the Invention

This invention relates to an insert material for solid phase diffusion welding for nickel (Ni) base superalloy and method therefor, particlularly to an insert material for solid phase diffuion welding for Ni base superalloy and method therefor suited for attaining high welding strength.

Insert material for nickel base superalloy solid phase diffusion welding and method therefor relating to the present invention can be preferably used in, for instance, stator blades, rotor blades of a gas turbine or a jet engine etc., or parts of a turbocharger and the like and other members requiring high strength at a high temperature and used for manuracture thereof.

2. Description of the Prior Art

In the prior arts related to the welding of superalloy are there liquid phase diffusion welding methods utilizing Ni-B system insert material or sputtered film, which for example are disclosed in Japanese Patent Publication No. Sho 49-6470 and Japanese Patent Laid-open No. Sho 47-33850. These methods are characterized in that the welding pressure is small.

However, said prior art is not considered with respect to the welding strength. The chemical composition of insert material for welding $\gamma'$-precipitated-hardened Ni-base superalloy excellent in heat resisting strength is limited to that of Ni-B system ones or the like having the melting point lower than that of base metal, i.e. Ni base superalloy since the welding surface needs to be melted. As a result, the chemical composition of welding portion differs largely from that of base metal so that the reduction of strength of welding portion is a matter of concern. Also, the welding of oxide dispersion strengthened superalloy presents problems of cohesion of dispersed particles due to the melting of welding portion, so that the welding strength is considered to be reduced.

On the other hand, the reduction of welding strength is prevented by means of solid phase diffusion welding with the insert material having not only the strength equal to that of base metal, but also the composition suited for welding process.

SUMMARY OF THE INVENTION

An object of this invention is to provide an insert material for solid phase diffusion welding for Ni base superalloy and method thereof suited for attaining high welding strength.

The object of this invention is attained by an insert material for solid phase diffusion welding in which a total atomic amount of at least one selected from aluminum, titanium, tantalum and niobium is 5–25% by atomic %, total atomic amount of at least one selected from chromium, cobalt, tungsten, molybdenum and zirconium is [100−(total atomic % of aluminum, titanium, tantalum and niobium)×4]% or less by atomic % and the remaining is substantially occupied by nickel.

Further, the welding strength can be further improved by making crystal grain diameter of insert material for solid phase diffusion welding 10 $\mu$m or less.

Preferably the carbon amount included in the insert material as impurities is less than 0.006 wt %.

The solid phase diffusion welding method according to this invention comprises interposing between the welded surfaces of nickel base superalloy containing nickel as main component the insert material containing 5–25% by atomic % of total atomic amount of at least one selected from aluminum, titanium, tantalum and niobium, [100−(total atomic % of aluminum, titanium, tantalum and niobium)×4]% or less by atomic % of total atomic amount of at least one selected from chromium, cobalt, tungsten, molybdenum and zirconium and the balance being substantially nickel heat treated in vacuum or inert gas at temperature of 700° C. or more and heating in vacuum or inert gas the insert material at a temperature of the melting point or less of the superalloy for solid phase diffusion welding.

Also, the method comprises interposing between the welded surfaces of nickel base superalloy having nickel as main component a plastically worked insert material containing 5–25% by atomic % of total atomic amount of at least one selected from aluminum, titanium, tantalum and niubium, [100−(total atomic % of aluminum, titanium, tantalum and niobium)×4]% or less by atomic % of total atomic amount at least one selected from chromium, cobalt, tungsten, molybdenum and zirconium and substantially remaining nickel and heating in vacuum or inert gas the insert material at a temperature of the melting point or less of the superalloy for solid phase diffusion welding.

DETAILED DESCRIPTION OF THE PREFERRED EMBODIMENT

Figures 1, 2:
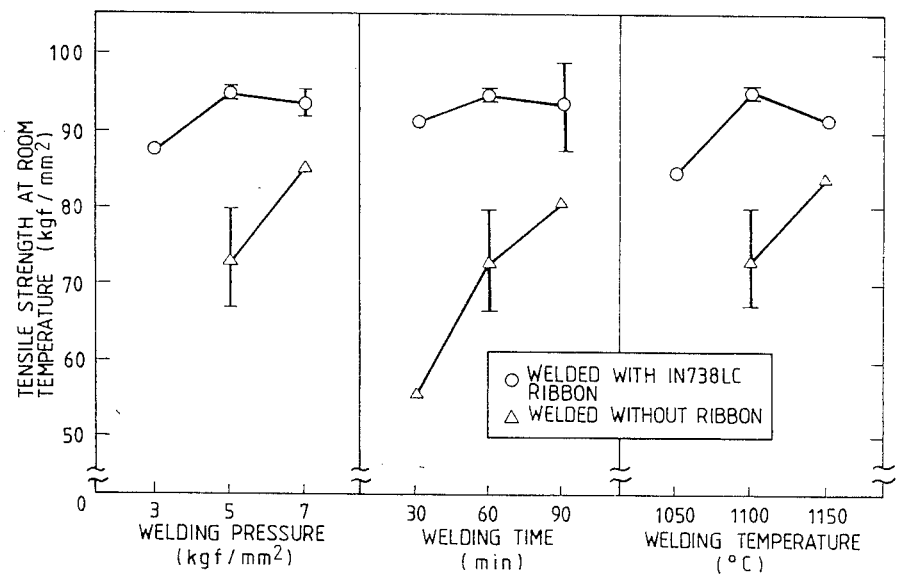
FIG. 1 is a graph showing formations produced in a ribbon of rapidly solidified superalloy heat treated at various temperatures for one hour.
FIG. 2 is a characteristic diagram showing the relationship between the welding conditions and the tensile strength at room temperature when pressure, time and temperature as solid phase diffusion welding conditions are varied for welding.

Carbon is not preferable for the insert material according to this invention. In the $\gamma'$-precipitated-hardened Ni base superalloy excellent in heat resisting strength are contained aluminum for improving strength and chromium for improving corrosion resitsance, so that the $\gamma'$-precipitated-hardened Ni base superalloy needs to be welded in vacuum or inert gas.

In solid phase diffusion welding in vacuum or inert gas, however, carbon moves to the welding surfaces to form carbide, resulting in the degradation of welding strength. Thus, 0.006 wt % or less carbon is preferable. The formed carbide within this range does not show adverse actions.

5-25% by atomic % of total atomic amount of at least one selected from aluminum, titanium, tantalum and niobium is preferably contained in the chemical composition of insert material to improve the welding strength. These are all elements forming γ'-precipitates to improve the welding strength by precipitation strengthening. When the total atomic amount of these elements falls within said range, influences of different elements is small. An amount less than that within said range reduces unfavorably the welding strength and forms adverse phases to reduce the strength.

The chemical composition of insert material also contains at least one selected from chromium, cobalt, tungsten, molybdenum and zirconium, preferably [100−(total atomic % of aluminum, titanium, tantalum and niobium)×4]% or less atomic %. The addition of elements exceeding the amount here specified forms adverse phases to reduce the strength. Within this range, chromium is effective for corrosion resistance, cobalt and zirconium effective for toughness and tungsten and molybdenum effective for improving the strength.

Composition ranges of the insert material or base metal relating to the present invention are preferably the same as that of the main ingredients of a nickel base superalloy covering, by atomic %, from 2 to 25% for Al, from 0 to 15% for Ti, from 0 to 15% for Nb, from 0 to 15% for Ta, from 0 to 25% for Cr, from 0 to 20% for Co, from 0 to 5% for Mo, from 0 to 5% for W, from 0 to 5% for Zr, and the balance being substantially Ni, a nickel base superalloy covering from 4 to 20% for Al, from 0 to 10% for Ti, from 0 to 10% for Nb, from 0 to 10% for Ta, from 5 to 20% for Cr, from 0 to 10% for Co, from 0 to 3% for W, from 0 to 5% for Zr the balance being and substantially Ni. Concrete examples of these nickel base superalloys are listed, René80 main ingredients, excluding carbon: (6.5% for Al, 6.0% for Ti, 15.0% for Cr, 9.0% for Co, 2.5% for Mo, 1.5% for W, 0.02% for Zr and the balance being substantially main ingredients, excluding carbon: Ni), IN738LC (7.3% for Al, 4.0% for Ti, 0.5% for Nb, 0.5% for Ta, 17.3% for Cr, 8.2% for Co, 1.0% for Mo, 0.8% for W, 0.02% for Zr and balance being substantially Ni) and so on.

In the insert material used for solid phase diffusion welding in the present invention, the content of carbon contained as an impurity is preferably less than 0.006 wt %. Satisfactory welding can be obtained by reducing the carbon content in this way.

However, if the carbon atoms contained can be fixed in the form of a carbide in the matrix by heat treatment or plastically working, those having 0.006 wt % or more of the carbon content can be used as the insert material according to present invention.

Also, in the present invention, the diffusion of atoms is facilitated by making the crystal grain diameter of insert material 10 μm or less at the time of solid phase diffusion welding, so that the welding strength is found to be improved further. This is because 10 μm or less of crystal grain diameter generates a super plastic phenomenon. Thus, the insert material is deformed along the surface of base metal with low welding pressure to facilitate the diffusion of atoms and weld more completely the solid phases with improved welding strength. The superalloy is a cast alloy which cannot be usually forged. Thus the crystal grains are difficult to be pulverized by methods of working, heat treatment, etc., whereas by the rapid solidification of superalloy the crystal grains are found to be easily pulverized.

It is difficult to have carbon content less than 0.006 wt % in a nickel alloy insert material, since about 0.006 wt % of carbon is mixed into an usually made metal material even in slight pollution. It is found that the carbon is solidified as carbide in the insert material by the previous heat treatment of the insert material as a counterplan and consequently not formed on the welding surfaces in the adverse form.

Also, it is found that even plastic working of insert material has same effect as the heat treatment has.

The most suitable insert material for solid phase diffusion welding giving the high welding strength of Ni base superalloy is that of the same kind Ni base superalloy. In this case, the rapidly solidified Ni base superalloy has the largest quantity of carbon in the form of adverse solid solution in the insert material. Then, in order to confirm how effective it is to give previously heat treatment or plastic working to the insert material, a ribbon of rapidly solidified superalloy was prepared by a twin-roll process of one kind of rapid solidification process to confirm the carbon fixing capacity by heat treatment. René80 was used for the Ni base superalloy. As seen in the structure by an electron microscope, the ribbon left solidified rapidly has no carbide in the ribbon grains, but carbon atoms were soluted in matrix. On the other hand, the structure of ribbon subjected to heat treatment at 1000° C. for one hour showed that round black carbide was formed in the crystal grains as shown in the photograph of electron microscope. In such a case, the carbon atoms soluted in matrix are fixed as carbide, so that it is not formed on the welding surfaces in the adverse form and thus the welding strength can be improved.

FIG. 1 shows formations in the ribbon of rapidly solidified superalloy when they were subjected to heat treatment at various temperature for one hour. Here, MC designates MC carbides, γ' designates $L_{12}$ type inter metallic compound of nickel and aluminum, and $H_{23}C_6$ and $M_6C$ designates carbide formed by heat treatment which soluted earlier in the crystal grains.

Thus, it is found that the fixation of carbon atoms soluted in matrix is obtained by heat treatment at 800° C. or more for one hour. According to the structure of ribbon subjected to heat treatment at 800° C. for one hour, round black carbide was formed grains as shown by the electron microscope. Also, it was clarified that, even in the heat treatment at less than 700° C., for one hour or more, carbon atoms soluted in matrix are fixed in the crystal grains. However, it is clarified that, in the heat treatment at less than 700° C., carbon atoms soluted in matrix which are not fixed as carbide remains in the crystal grains even by heat treatment for a long time. Thus, it can be said to be extremely effective method that the insert material is previously subjected to heat treatment at 700° C. or more to improve the welding strength.

A method for applying heat treatment to the insert material relating to the present invention should be carried out preferably at 700° C. or more, and below its melting point and more preferably at a temperature where γ' phase stays as a solid solution or below a temperature where γ' phase is decomposed, normally below 1250° C. The reason why the abovementioned temperature ranges are preferable is because decomposition of γ' phase may cause the state of single phase of nickel base superalloy accompanied by enlargement of crystal sizes, resulting in deteriorated superplastic potential.

On the other hand, effects similar to heat treatment are also obtained by the previous plastic working to insert material. Numerous internal defects such as dislocation are introduced into the insert material by the plastic working. These internal defects rapidly and effectively form carbon as carbide. As a result, the carbon atoms soluted in matrix in the insert material are rapidly formed as carbide in the temperature raising process for welding to be fixed in the interior, so that it is never formed on the welding surfaces. Accordingly, the welding strength can be improved.

Insert material for nickel base superalloy solid phase diffusion welding and method therefor relating to the present invention can be preferably used in, for instance, stator blades, rotor blades of a gas turbine or a jet engine etc., or parts of a turbocharger and the like and other members requiring high strength at a high temperature and used for manufacture thereof. In the case, for instance, rotor blades of a gas turbine (jet engine), it is possible not only to simply weld two of them together in the direction parallel to the direction of pressure axis, but also to form a complex blade by welding together a plurality of parts more than three pieces, together with possibility of welding them in the direction normal to the direction of pressure axis, and this method of welding is preferably used particularly in repair welding on the tip areas of blades.

EMBODIMENT

In this embodiment was used γ'-precipitated-hardened Ni base superalloy René80 for the welding base metal. For the welding insert material was used a ribbon made by a twin-roll process of one kind of rapid solidification process, that is, to contact liquid to the roll rotating with high speed and solidify it. Alloys used for the welding insert material were TMP-3 as γ'-precipitated-hardened Ni base superalloy, IN738LC and René80 as existing γ'-precipitated-hardened Ni base superalloy, and TMP-3FC, IN738FC and René80FC which are produced by removing C of the above-mentioned alloys, and further were ones of Ni-Al-X ternary composition of Ni-20Al-5Cr, Ni-20Al-5Co, Ni-20Al-1W, Ni-15Al-5Ti, Ni-15Al-5Ta, and Ni-15Al-5Nb (all represented by atomic percentage) consisting of main component elements of γ'-precipitated-hardened Ni base superalloy. Table 1 shows the chemical composition of a test piece of welding insert material, wherein the carbon content is indicated by weight percent and other ingredients by atomic percent. Further, while said Ni-Al-X ternary alloy composition is of mother alloy compound, the analytical value and compound composition of ribbon are approximately equal.

Twin rolls having 150 mm diameter and made of Cu-Be and a quartz nozzle having 1 mm bore were used for preparing the ribbon under the carbon gas atmosphere of 700 Torr. Conditions for the preparation were 10 m/s of peripheral speed of roll, 700 kgf of press force of roll and 3 kgf/cm$^2$ of molten metal ejected pressure. The configuration of ribbon is of aobut 100 μm thickness and 8-15 mm width. The crystal grains of the ribbon prepared under these conditions are pulverized into about 1 μm size.

A test piece was welded, heated by a tungsten mesh heater and tested by an instron type tension tester. Welding conditions were the atmosphere of vacuum higher than $6 \times 10^{-5}$ Torr, 1050°-1200° C. of welding temperature, 3-7 kgf/mm$^2$ of welding pressure and 30-90 min. of welding time. The welding base metal is a precision casting product (René80) having 8 mm of diameter and 1 μm of average surface roughness.

The welding strength was estimated by the tension test. The tension speed is 0.1 mm/min. The test piece has 8 mm of length and 2 mm of diameter in the parallel portion and cut out of the welded test piece for use. The welding interface is located at the center of the tension test piece and perpendicularly to the pressure axis. Here, since the welding strength is a central problem, whether fractured portion of the tension test piece was watched in the welding interface or in the base metal and the welding strength was estimated by the tensile strength at that time with respect to the test piece fractured at welding interface.

The welded portion was analyzed by Electron probe microanalyzer analysis. The accelerating voltage is 15 KV, beam current 0,2 μA and beam diameter 1-2 μm. Ni was analyzed by the use of Kβ radiation and the other elements were analyzed by the use of Kα radiation.

FIG. 2 shows the relationship between welding conditions and tensile strength at room temperature as a result of examination of conditions for solid phase diffusion welding in which the reference conditions are 5 kgf/mm$^2$ of welding pressure, 60 min. of welding time and 1100° C. of welding temperature, and the welding pressure, time and temperature are varied. Also, to examine the effect of fine grain insert material in the solid phase diffusion welding, the case of using the fine grain IN738LC ribbon for welding insert material was compared with that of using René80 base metals themselves welded with each other without using the welding insert material. FIG. 2 shows that the tensile strength is increased to contribute to the improvement on the welding strength in either welding conditions when the ribbon is used. It is understood from this fact that the use of fine grain material for the welding insert material has the effect on the improvement on the welding strength.

Figure 3:
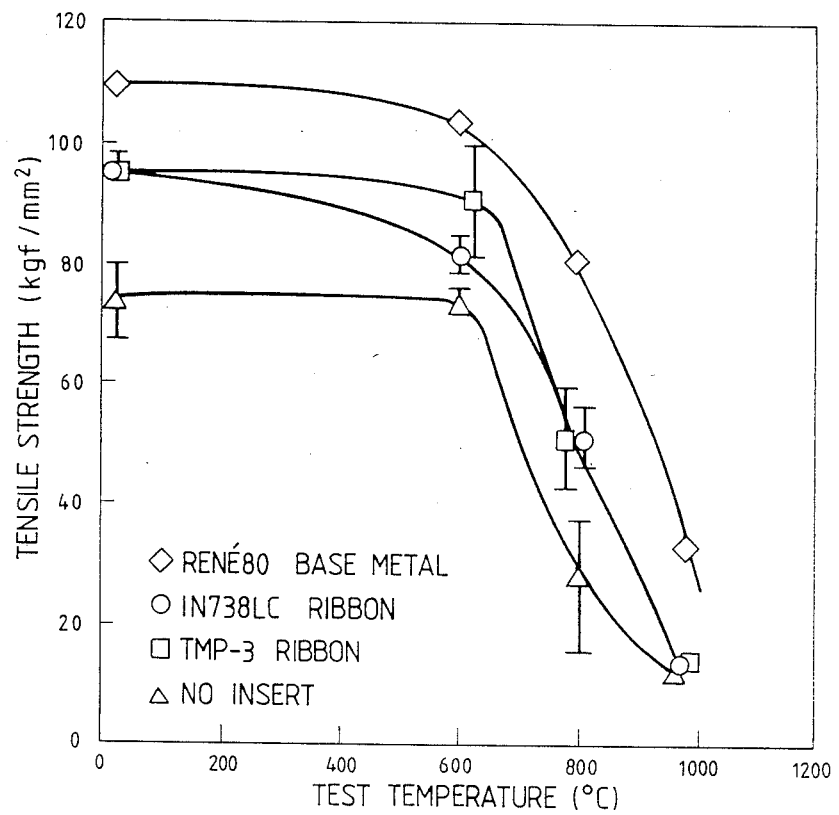
FIG. 3 is a characteristic diagram showing the result of tension test at high temperature.

Further, FIG. 3 shows the results of high temperature tension test of René80 material used for the welding base metal, welding material using IN738LC and TMP-3 ribbon for the welding insert material, and base metal welded with each other without the use of ribbon. Those materials welded by the use of fine grain ribbon show a welding strength which is higher than those without the use of ribbon within any range of tempera-

TABLE 1

| Alloy | Co | Cr | Mo | W | Al | Ti | Nb + Ta | C | Zr | B | Fe |
|---|---|---|---|---|---|---|---|---|---|---|---|
| TMP-3 | 6.98 | 10.82 | 3.11 | 3.52 | 3.81 | 2.83 | 3.93 | 0.07 | 0.05 | 0.10 | 0.06 |
| Rene80 | 9.51 | 13.94 | 3.90 | 4.06 | 2.96 | 5.02 | — | 0.16 | 0.04 | 0.01 | — |
| IN738LC | 8.63 | 15.99 | 1.71 | 2.52 | 3.32 | 3.38 | 0.48 | 0.1 | 0.08 | 0.01 | — |
| TMP-3FC | 6.51 | 10.4 | 3.11 | 3.58 | 3.69 | 2.56 | 4.09 | 0.0067 | 0.045 | — | — |
| Rene80FC | 9.9 | 14.0 | 4.05 | 4.08 | 3.14 | 5.13 | — | 0.006 | 0.025 | — | — |
| IN738FC | 8.20 | 15.60 | 1.65 | 2.59 | 3.23 | 3.33 | 2.65 | 0.007 | 0.10 | — | — | tures, although this strength is lower than that of the base metal.

Next, the effect of insert composition on the welding strength was examine. Table 2 shows the result of room temperature tension test of welding material using various composition of ribbons for the welding insert material.

TABLE 2

| Welding base metal | welding insert material | Fracture condition of tension test | |
|---|---|---|---|
| | | fractured at base material (shown by mark ○) | fractured at welding surface (shows tensile strength kgf/m$^2$) |
| Rene 80 | — | | 79.9 |
| | IN738LC | | 102.0 |
| | IN738FC | | 105.6 |
| | TMP-3 | | 98.1 |
| | TMP-3FC | | 107.5 |
| | Rene 80 | | 74.7 |
| | Rene 80FC | | 100.0 |

Though the ribbon related to the existing alloy provides the welding strength higher than that in case that without using the ribbon, all test pieces were fractured in the welding interface. Three FC system alloys containing a small amount of C improved welding strength in every case. On the other hand, the base metals were all fractured when Ni-Al-X system ribbons were used, where Ni-Al-X system ribbon contains no carbon. It is apparent from the above that the welding strength can be improved by making the C contained in the welding insert material composition less than 0.006 wt %. Also, the effect of other elements can be understood.

Figure 5:
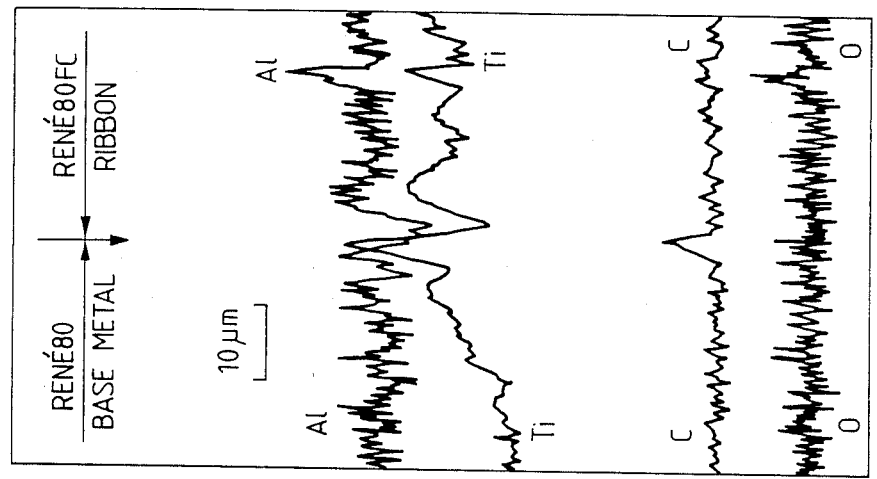
FIG. 5 is a graph showing the result of Electron probe microanalyzer analysis of welding interface using René80FC ribbon.
Figure 4:
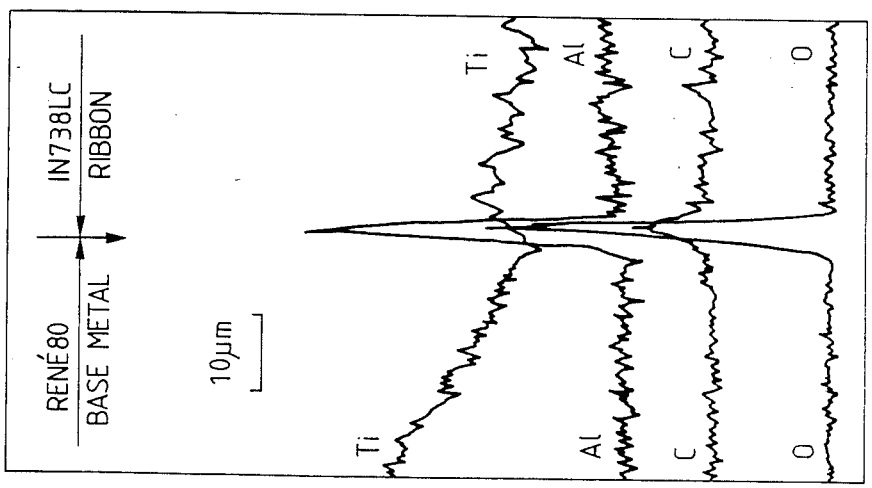
FIG. 4 is a graph showing the result of Electron probe microanalyzer analysis of welding interface using IN738LC ribbon.
Figure 6:
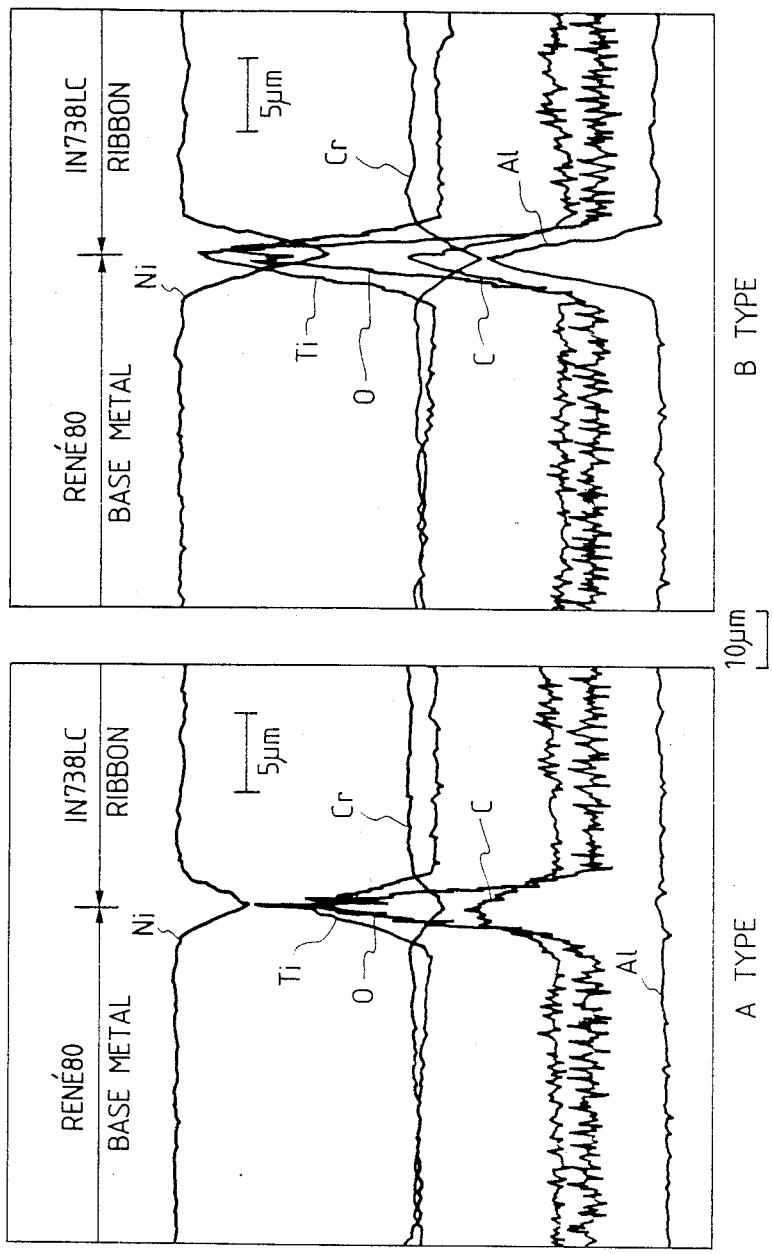
FIG. 6 is a graph showing the result of Electron probe microanalyzer analysis observed in welding at 1200° C.

FIG. 4 shows the result of Electron probe microanalizer analysis of welding interface using IN738LC ribbon. A large peak of C is seen. FIG. 5 shows the result of Electron probe microanalizer analysis of welding interface using René80FC as an example of FC system ribbon. The peak of C is shown also with the FC system ribbon. FIG. 6 shows the result of Electron probe microanalizer analysis observed under the accelerating voltage 1 KV in the welding at 1200° C. The ash (A type) and black (B type) formations extend linearly on the welding interface, and as a result of analysis the A type formation is considered to be Ti(C, O) and B type formation Al oxide. When the welding strength is thus reduced, carbide is formed on the welding surface. Here it can be easily understood from Table 2 that C contained near the welding interface is supplied from the welding insert material.

Next, IN738LC ribbon previously subjected to heat treatment in vacuum at 1100° C. for about one hour was welded by the same method as above mentioned. As a result, the fracture took place in the base metal. Probably this is because the carbon atoms soluted in matrix contained in the crystal grains was already fixed in the crystal grains as carbide before the welding by heat treatment, so that the carbide was not formed on the welding surface at welding. The heat treatment before the welding can be said to be thus a very effective method for improving the welding strength. Further, this result applies similarly to the other composition shown on Table 1.

Also, when IN738LC ribbon previously subjected to 10% plastic working by cold rolling was used for welding by the same method as above mentioned, the base metal could be fractured. This is because the carbon atoms soluted in matrix contained in the crystal grains was fixed already in the crystal grains as carbide before welding by the plastic working similarly to the heat treatment, so that the carbide was not formed on the welding surfaces at welding. Such plastic working before the welding can be said to be extremely effective method for improving the welding strength.

Further, in this embodiment, while the ribbon was used for the insert material, other powder or solidified powder prepared by the application of rapid solidification process, crystal grains pulverized by the application of process of thermal spraying or the like and ones using processes of sputter, CVD, etc. may be used within the scope of this invention.

Furthermore, the heat treatment after the plastic working is also preferable and within the scope of this invention.

According to this invention, the welding insert material composition suited for improving the welding strength can be provided so that $\gamma'$-precipitated-hardened Ni base superalloy with excellent heat resisting strength is effectively improved with respect to the welding strength.

What is claimed is:

1. A nickel base superalloy solid phase diffusion welding method comprising the steps of:
   interposing, between two surfaces of a nickel base superalloy having nickel as a main component, an insert material of an alloy consisting essentially of about 5–25 atomic % of at least one element selected from the group consisting of aluminum, titanium, tantalum and niobium; (100-(total atomic % of aluminum, titanium, tantalum and niobium)×4) atomic % or less of at least one element selected from the group consisting of chromium, cobalt, tungsten, molybdenum and zirconium; and the balance being substantially nickel;
   applying a heat treatment of 700° C. or above to said insert material to precipitate carbon therein in the form of a carbide; and
   heating said insert and nickel base superalloy surfaces in a vacuum or in an inert gas for solid phase diffusion welding thereof.

2. A nickel base superalloy solid phase diffusion welding method, comprising the steps of:
   interposing, between two surfaces of nickel base superalloy having nickel as a main component, an insert material consisting essentially of about 5–25 atomic % of at least one element selected from the group consisting of aluminum, titanium, tantalum and niobium; (100−(total atomic % of aluminum, titanium, tantalum and niobium)×4) atomic % or less of at least one element selected from the group consisting of chromium, cobalt, tungsten, molybdenum and zirconium; and the balance being substantially nickel;
   plastically working the insert to rapidly form carbon in the form of a carbide in the course of temperature elevation of the solid phase diffusion welding; and
   heating said insert and nickel base superalloy surfaces in a vacuum or in an inert gas for solid phase diffusion welding thereof.

3. A nickel base superalloy solid phase diffusion welding method comprising the steps of:
   interposing an insert material between two surfaces of a nickel base superalloy having nickel as a main component, said insert material having nickel as a main component, and comprising an alloy consisting essentially of: about 5-25 atomic percent of at least one element selected from the group consisting of aluminum, titanium, tantalum and niobium; (100−(total atomic percent of aluminum, titanium, tantalum and niobium)×4) atomic percent or less of at least one element selected from the group consisting of chromium, cobalt, tungsten, molybdenum and zirconium; carbon in an amount of less then 0.006 weight percent; and the balance being being substantially nickel; and heating said insert and nickel base superalloy surfaces in a vacuum or in an inert gas to a temperature sufficient to melt said insert and said nickel superalloy surfaces for joining same for solid phase diffusion welding.

4. A nickel base superalloy solid phase diffusion welding method comprising the steps of:

interposing, between two surfaces of a nickel base superalloy having nickel as a main component, an insert material of alloy consisting essentially of about 5-25 atomic % of at least one element selected from the group consisting of aluminum, titanium, tantalum and niobium; (100−(total atomic % of aluminum, titanium, tantalum and niobium)×4) atomic % or less of at least one element selected from the group consisting of chromium, cobalt, tungsten, molybdenum and zirconium; and the balance being substantially nickel;

heat treating the insert for a sufficient time and at a sufficient temperature and to precipitate carbon in the form of a carbide therein; and subsequently heating said insert and nickel base superalloy surfaces in a vacuum or in an inert gas at a sufficient temperature and for a sufficient time to join said surfaces by solid phase diffusion welding.

5. A nickel base superally solid phase diffusion welding method comprising the steps of:

interposing, between two surfaces of a nickel base superalloy having nickel as a main component, as insert material of alloy consisting essentially of about 5-25 atomic % of at least one element selected from the group consisting of aluminum, titanium, tantalum and niobium; (100−(total atomic % of aluminum, titanium, tantalum and niobium)×4) atomic % or less of at least one element selected from the group consisting of chromium, cobalt, tungsten, molybdenum and zirconium; and the balance being substantially nickel;

plastically working the insert to rapidly form carbon in the form of a carbide in the course of temperature elevation of the solid phase diffusion welding; and subsequently heating said insert and nickel base superalloy surfaces in a vacuum or in an inert gas at a sufficient temperature and for a sufficient time to join said surfaces by solid phase diffusion welding.

6. The invention defined by any one of claims 4 through 8 wherein the insert consists essentially of the following composition in atomic %: 4 to 20% aluminum, 0 to 10% titanium, 0 to 10% niobium, 0 to 10% tantalum, 5 to 20% chromium, 0 to 10% cobalt, 0 to 3% molybdenum, 0 to 3 tungsten, 0 to 5% zirconium, and the balance nickel.

7. The method as claimed in claim 1, wherein the step of applying a heat treatment of 700° C. or above to said insert material is performed before interposing said insert material between said two surfaces of said nickel base superalloy.

8. The method as claimed in claim 2 wherein the step of plastically working said insert material is performed before interposing said insert material between said two surfaces of said nickel base superalloy.

9. The method as claimed in claim 4 wherein said heat treatment of said insert material is performed before interposing said insert material between said two surfaces of said nickel base superalloy.

10. The method as claimed in claim 5 wherein the step of plastically working said insert material is performed before interposing said insert material between said two surfaces of said nickel base superalloy.

* * * * *

UNITED STATES PATENT AND TRADEMARK OFFICE
CERTIFICATE OF CORRECTION

PATENT NO. : 4,973,366
DATED : November 27, 1990
INVENTOR(S) : Yasuda, et al.

Page 1 of 2

It is certified that error appears in the above-indentified patent and that said Letters Patent is hereby corrected as shown below:

Column 3:

line 34, before "the balance being" insert --and--;
line 35, delete "and" before "substantially";
line 35, after "Ni" insert --, with the carbon content line 36, delete "listed" before "Rene 80";
before "main" insert --(--;
line 37, delete "(" before "6.5%";
line 40, delete "main ingredients, excluding carbon:";
line 41, before "7.3% for Al" insert --main ingredients, excluding carbon:--
line 43, before "balance" insert --the--.

UNITED STATES PATENT AND TRADEMARK OFFICE
CERTIFICATE OF CORRECTION

PATENT NO. : 4,973,366
DATED : November 27, 1990
INVENTOR(S) : Yasuda et al.

It is certified that error appears in the above-identified patent and that said Letters Patent is hereby corrected as shown below:

```
Column 4, line 47, after "formed", insert --in the crystal--.
Column 5, after TABLE 1, line 63, insert the following caption:
--CARBON CONTENT INDICATED BY WEIGHT PERCENT; OTHER INGREDIENTS
INDICATED BY ATOMIC PERCENT--.
Column 7, line 57, delete "was" and insert therefor --were--.
Column 8, line 46, after "of", insert --a--.
Column 9, line 11, delete "then" and insert therefor --than--;
         line 12, delete "being";
         line 41, after "component," delete "as" and insert
therefor --an--.
```

Signed and Sealed this

Eighteenth Day of April, 1995

BRUCE LEHMAN

*Commissioner of Patents and Trademarks*

*Attest:*

*Attesting Officer*